July 4, 1939. E. E. GRANGER 2,164,399
COFFEE LEACHER
Filed April 15, 1938
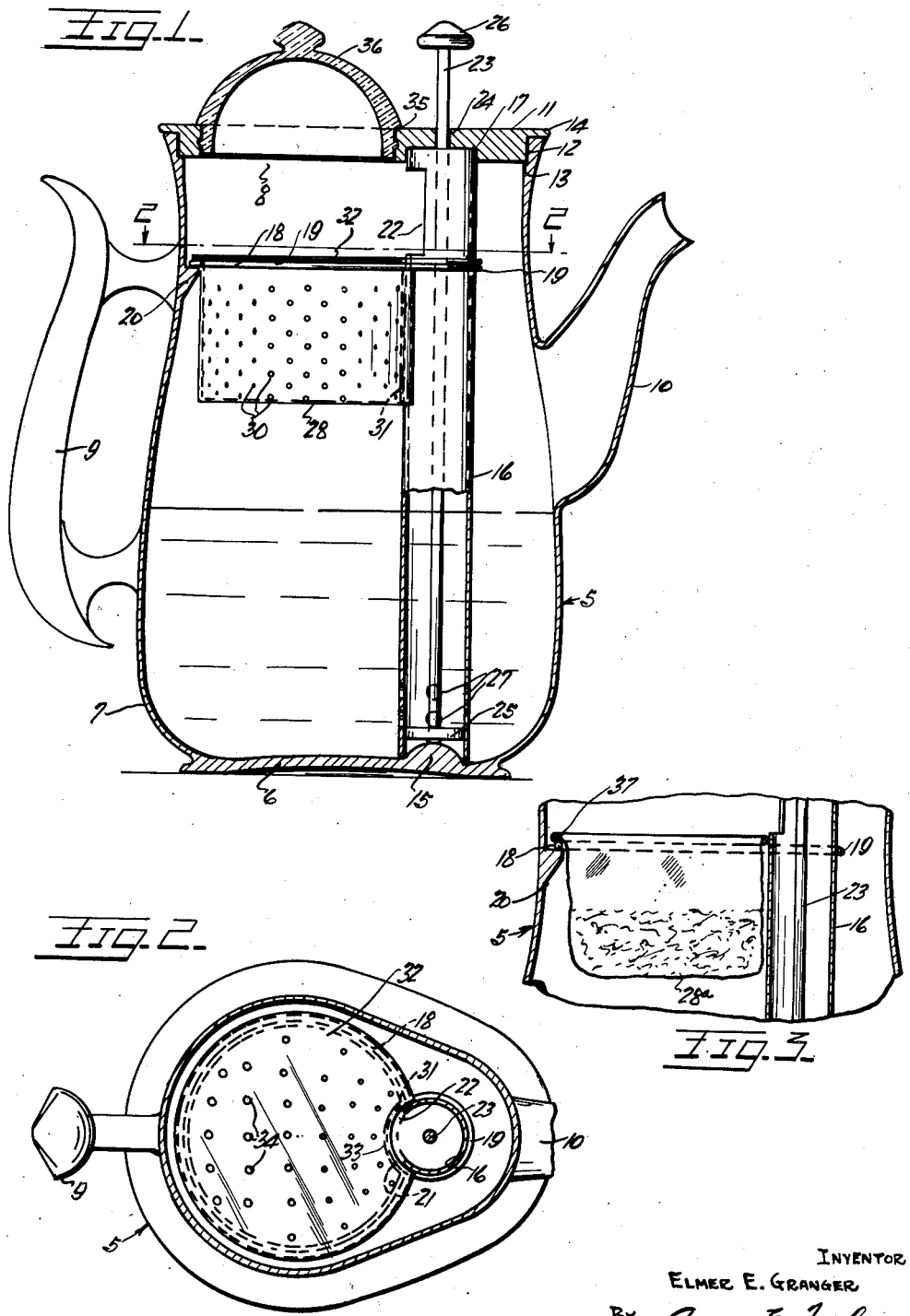
Inventor
ELMER E. GRANGER
By Adam E. Fisher
ATTORNEY Patented July 4, 1939

2,164,399

UNITED STATES PATENT OFFICE 2,164,399

COFFEE LEACHER

Elmer E. Granger, Reno, Nev.

Application April 15, 1938, Serial No. 202,145

2 Claims. (Cl. 53—3)

My invention relates to improvements in coffee leachers or devices for preparing a coffee beverage or infusion from the ground coffee beans.

The main object of the invention is to provide a device by which the necessary passage of the water through the ground coffee may be brought about by a leaching or lixiviating action such as will hasten the process and reduce the percentage of the objectional narcotic ingredient resulting in the solution.

Another object is to provide a device of this kind in which the actual operation of preparing the coffee beverage may be carried out right at the table and without placing the device itself on the stove.

A further object is to provide a device of this kind in a simple, durable, inexpensive and readily cleaned form.

The foregoing and other more specific objects of my invention will be made apparent in the course of the following detailed specification, reference being had to the accompanying drawing wherein Figure 1 is a vertical sectional view of my device;

Figure 2 is a horizontal cross section along the line 2—2 in Figure 1;

Figure 3 is a fragmental vertical section showing a modified assembly.

Referring now with more particularity to the drawing, in carrying out my invention, I provide a pot or container 5 of single compartment construction having the bottom 6, side walls 7 and open top 8. A handle 9 is secured vertically to one side of the pot and a spout 10 is provided at the opposite side so that the pot may be lifted and tilted to pour out its contents in well known manner. A cover 11 is provided and is adapted to seat with a frictional engagement down into the upper rim 12 of the pot against a shoulder 13 extended inwardly as shown, this cover also having a marginal flange 14 to overlie the pot rim as shown. It may here be stated that the cover 11 may be provided with a locking device of any suitable form to hold it in place on the pot, should a mere frictional engagement be deemed insufficient to hold the cover. The cover may also be hinged to the pot if so desired and as will be hereinafter further recited.

For convenience in description the side of the pot at which the spout 10 is located is hereinafter termed the frontal side and the opposite side carrying the handle 9 is termed the rear or rear side of the pot.

Adjacent then to this frontal side of the pot the bottom 6 has an upthrust boss 15 which serves as a seat and pilot to receive the open lower end of the pump tube or cylinder 16 which is of elongated tubular form as shown. From the bottom 6 of the pot on which it is held by the boss 15, the tube 16 extends upward vertically and its upper end (also open) seats in a pocket 17 formed in the underside of the cover 11 at a point in vertical alignment with the boss 15. With the cover 11 in place the pump tube 16 is thus held vertically in the pot but, when the cover is removed, the tube may be readily lifted out for washing and cleaning. Some distance from its upper end an annular suspension ring 18 is horizontally supported from the pump tube 16 by means of an eye or band 19 which encircles the tube as shown. This ring 18 extends rearwardly from the pump tube as shown and, with the tube in place in the pot, the free extremity of the ring rests upon a ledge or shoulder 20 extended inwardly from the rear portion of the pot. At its frontal side the ring 18 has an arcuate inwardly turned portion 21 which receives the adjacent rear portion of the pump tube 16 in such manner that the tube effectually is partially disposed within the confines of the ring itself. From a point a short distance above the ring 18 to a point adjacent its upper end the tube is cut away to form a discharge opening 22.

A piston or pump rod 23 is slidably mounted through a bore 24 in the cover 11 down into the pump tube 6 and carries at its inner or lower end a piston 25 slidably fitting within the tube. At its upper extremity the rod 23 carries a knob 26 threaded in place and serving as a handle by which the pump rod and piston may be vertically reciprocated in the tube. Adjacent its lower end the tube 16 also has a series of inlet apertures 27 so located that the piston 25 may be lowered to a point beneath these apertures. Therefore, when the pot 5 is partially filled with water and the piston is lowered to this point, the water will enter the tube at 27 and, by pulling upwardly on the knob 26, the water in the tube may be carried upwardly and discharged through the opening 22. This action may of course be repeated as long as desired by reciprocating the pump rod as described.

A coffee container, basket or cup 28 is provided and is of such diameter as to pass easily through the ring 18 wherein it is held by engagement of a marginally turned flange 29 with the ring. This basket 28 is perforated as at 30 so that the water may run through but these perforations are so small that ground coffee placed in the basket cannot escape. The frontal side of the basket is arcuately depressed from top to bottom as at 31 to fit against the adjacent rounded side of the pump tube 16. A perforated cover plate 32 may be placed over the basket 28 whereon it is retained by engagement of the notch 33 with the tube 16 as shown. The perforations 34 in this plate 32 increase in size outwardly away from the pump tube 16 so that the water discharged from the tube at 22 will be evenly distributed over the entire surface area of the basket 28 and over the coffee therein.

The cover 11 has an opening 35 located above the coffee basket and a glass dome 36 is removably mounted in this opening to permit a view of the interior of the pot while the cover is in place.

In use the ground coffee is placed in the basket 28 and hot water is placed in the pot 5 in whatever quantity desired. The knob 26 is then manipulated by hand to raise the water in the pump tube 16 causing it to pass down through the coffee and bring about the desired leaching or lixiviating action. After the coffee solution is thus prepared it may be poured off as required.

The advantages of this method of preparing the coffee are many. In the first place by regulating the number of pump strokes, the strength of the coffee solution may be varied and, since a minimum of "washing" action of the water through the coffee is thus attained, the amount or percentage of the narcotic ingredient extracted from the coffee is greatly reduced. Then too, the coffee may be prepared right at the table when ready and it is not necessary to heat the pot and then allow it to stand and "settle" as is now required.

The various parts may all be readily taken apart for cleaning when desired and the entire assembly is durable and convenient. In some instances it may be desirable to substitute a fabric bag or sack for the metal coffee container 28, as indicated at 28a in Figure 3, and for this purpose the ring 18 will still serve as a support simply by providing the bag 28a itself with a ring 37 slightly larger in diameter than the ring 18 as clearly shown.

Attention may here be directed to the preferred shape of the pot 5 wherein it is given an ovate shape or contour in horizontal cross section as shown in Figure 2 with the major axis at the rear and the minor axis at the front. This conformation places the greater part of the weight adjacent the handle 9 and makes pouring easier at the relatively narrow frontal portion adjacent the spout. Also, the ring 18 and supported parts being substantially the same radius of the interior of the pot at its rear portion, this shape of the pot prevents any axial displacement of the ring and other parts.

The cover 11 may, as previously mentioned, be hinged to the pot and for this arrangement the cover might be slotted from the bore 24 to the adjacent margin of the opening 35 so that, by removing the glass dome 36, the necessary clearance for the rod 23 would be provided as the cover was swung open.

It is understood that I may vary from the structure as herein shown and described, so as best to provide a practical device for the purposes intended, provided that such variations lie within the spirit and the scope of the appended claims.

I claim:

1. In combination with a coffee pot having an open top, a handle at its rear side and a spout at its frontal side, a locating boss formed upon the inner face of the bottom of the pot adjacent the spout and in alignment with the spout and handle, a cover for the pot having upon its inner face a locating pocket adapted for vertical alignment with the locating boss of the bottom when the cover is closed upon the pot the pocket having an axial bore extended out through the cover, a pump tube dimensioned and adapted to seat within the pot between the cover and the bottom thereof with its lower end over the locating boss of the bottom and its upper end within the pocket of the cover when the latter is closed, the tube being apertured at its lower end at points spaced upward from its lower extremity, and being cut away at its upper end in spaced relation to the upper extremity thereof and at its inner side facing the handle, to provide a discharge opening, a pump rod slidably mounted through the bore of the cover and extended down into the tube, a piston at the lower end of the pump rod within the tube and adapted to pass down below the apertures of the lower end of the tube, and a perforate coffee basket removably supported in the upper end of the pot between the pump tube and the rear side of the pot, below the discharge opening of the upper end of the pump tube, the basket being formed at its frontal side to partially embrace the pump tube below the discharge opening for receiving the full discharge from said opening.

2. In a device of the kind described, embodying a coffee pot having an open top, a handle and spout at diametrically opposite sides, and a cover for frictionally closing the top, vertically aligned tube locating means on the bottom and the cover adjacent the spout and in diametrical alignment with the spout and the handle, a pump tube dimensioned and adapted to fit vertically within the pot between the locating means of the cover and the bottom when the cover is in place on the pot, the tube being apertured at its lower end and being cut away at its upper end to provide a discharge opening at the rear side thereof, a pump rod slidably mounted through the cover and down into the pump tube, a piston at the lower end of the pump rod, a supporting ring removably mounted at the upper end of the pot between the pump tube and the rear side of the pot, the ring including a portion for encircling the pump tube, means for supporting the rear portion of the ring, a perforate coffee basket removably mounted within said supporting ring, below the discharge opening of the tube, the basket being concaved down its frontal side to partially embrace the pump tube, below the discharge opening thereof and a perforate cover plate for the basket the perforations thereof increasing in size outwardly from the pump tube for providing an equalized distribution of the liquid discharged from the pump tube.

ELMER E. GRANGER.